United States Patent
Prissok et al.

(10) Patent No.: US 9,181,382 B2
(45) Date of Patent: Nov. 10, 2015

(54) THERMOPLASTIC POLYURETHANE COMPRISING, AS PLASTICIZER, GLYCEROL ESTERIFIED WITH AT LEAST ONE ALIPHATIC CARBOXYLIC ACID

(75) Inventors: Frank Prissok, Lemföerde (DE); Jörn Duwenhorst, Lemföerde (DE); Andre Kamm, Bohmte (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/102,362

(22) Filed: May 6, 2011

(65) Prior Publication Data

US 2011/0275733 A1    Nov. 10, 2011

Related U.S. Application Data

(60) Provisional application No. 61/332,827, filed on May 10, 2010.

(51) Int. Cl.
| | |
|---|---|
| *C08K 5/103* | (2006.01) |
| *C08K 5/11* | (2006.01) |
| *C08L 75/04* | (2006.01) |
| *C08G 18/08* | (2006.01) |
| *C08G 18/40* | (2006.01) |
| *C08K 5/00* | (2006.01) |
| *C08G 18/06* | (2006.01) |
| *C08G 18/42* | (2006.01) |
| *C08G 18/48* | (2006.01) |
| *C08G 18/66* | (2006.01) |

(52) U.S. Cl.
CPC ............ *C08G 18/0838* (2013.01); *C08G 18/06* (2013.01); *C08G 18/0895* (2013.01); *C08G 18/40* (2013.01); *C08G 18/4238* (2013.01); *C08G 18/4854* (2013.01); *C08G 18/664* (2013.01); *C08G 18/6674* (2013.01); *C08K 5/0016* (2013.01); *C08K 5/103* (2013.01); *C08K 5/11* (2013.01); *C08L 75/04* (2013.01)

(58) Field of Classification Search
USPC .................. 524/310, 312, 317, 773

IPC ........ C08K 5/0016,5/103, 5/11; C08G 18/0838, C08G 18/40

See application file for complete search history.

(56) References Cited

U.S. PATENT DOCUMENTS

| | | | |
|---|---|---|---|
| 3,441,939 A | * | 4/1969 | Anderson, Jr. .................. 430/31 |
| 3,882,191 A | * | 5/1975 | Balatoni et al. ................ 525/125 |
| 2002/0058777 A1 | * | 5/2002 | Brauer et al. .................... 528/44 |
| 2007/0049685 A1 | | 3/2007 | Hansel et al. |
| 2009/0264614 A1 | * | 10/2009 | Hayashi et al. .................. 528/85 |
| 2011/0195148 A1 | * | 8/2011 | Mentink et al. .................... 426/3 |
| 2012/0065285 A1 | | 3/2012 | Braun et al. |

FOREIGN PATENT DOCUMENTS

| | | | |
|---|---|---|---|
| WO | WO 2007/029382 A1 | * | 3/2007 |
| WO | WO 2010/027640 A1 | | 3/2010 |
| WO | WO 2010/043813 A1 | * | 4/2010 |
| WO | WO 2010/124459 A1 | * | 11/2010 |

OTHER PUBLICATIONS

Sax et al.; Hawley's Condensed Chemical Dictionary, Eleventh Edition; Van Nostrand Reinhold; New York; 1987; pp. 569 and 1170.*
Dr. Hans Zweifel, "Plastics Additives Handbook", 5th Edition, Hanser Publishers, 2001, pp. 98-137 plus cover page.

* cited by examiner

*Primary Examiner* — Rabon Sergent

(74) *Attorney, Agent, or Firm* — Oblon, McClelland, Maier & Neustadt, L.L.P.

(57) ABSTRACT

The invention provides a thermoplastic polyurethane with at least one plasticizer, where at least one first plasticizer (i) is based on glycerol, and at least one hydroxy group of the glycerol has been esterified with a monocarboxylic acid (ii) which comprises 1, 2, 3, 4, 5, or 6 carbon atoms, more preferably 2, 3, or 4 carbon atoms, and very particularly preferably 2 carbon atoms. The invention further comprises a process for producing the thermoplastic polyurethane with the plasticizer (i), a process for coating products with said thermoplastic polyurethane, the use of the thermoplastic polyurethane, and also the use of plasticizers based on glycerol for thermoplastic polyurethane.

11 Claims, No Drawings

THERMOPLASTIC POLYURETHANE COMPRISING, AS PLASTICIZER, GLYCEROL ESTERIFIED WITH AT LEAST ONE ALIPHATIC CARBOXYLIC ACID

Thermoplastic polyurethane comprising, as plasticizer, glycerol esterified with at least one aliphatic carboxylic acid

DESCRIPTION

The present invention relates to thermoplastic polyurethanes, hereinafter also termed TPUs, comprising at least one plasticizer (i) based on glycerol.

Thermoplastic polyurethanes have a wide variety of applications. By way of example, thermoplastic polyurethanes are found in the automobile industry, e.g. in instrument-panel skins, in foils, in cable sheathing, in the leisure industry, and in the form of functional and design elements for sports shoes, and in the form of soft component in hard-soft combinations.

The hardness level of thermoplastic polyurethanes is usually from 80 Shore A to 74 Shore D. However, many of the abovementioned applications require a hardness level below 80 Shore A. In the prior art, plasticizers which can lower Shore hardness are therefore added to thermoplastics. Examples of familiar plasticizers are benzoates, phthalates and phosphoric esters.

When the plasticizer is selected, it is preferable to ensure that the product is compatible with the thermoplastic polyurethane. In this context, compatible means that the plasticizer must be capable of admixture with the thermoplastic polyurethane during the conventional processes for producing thermoplastic polyurethanes, and that the plasticizer remains subsequently to the greatest possible extent within the product, and is not lost via exudation or evaporation. Furthermore, there should be no deterioration of the mechanical properties of the thermoplastic polyurethane, e.g. abrasion and elastomeric properties. Many plasticized thermoplastic polyurethanes are used in applications which also have exposure to sunlight, e.g. design elements for the shoe industry. Any contribution of the plasticizer toward yellowing of the product here via UV degradation is disadvantageous.

US 2007/0049685 describes the use of trimethylolalkanes esterified with aromatic carboxylic acids having at least 6 carbon atoms and/or aliphatic carboxylic acids having at least 7 carbon atoms.

The disadvantages of those compounds are that, because of the high proportion of long, aliphatic hydrocarbon chains or aromatic hydrocarbons, they have only low compatibility with the polar polyurethanes, with resultant severe restriction of plasticizer-absorption capacity. Furthermore, compounds of this type based on trimethylolalkanes are not approved for contact with foods, or in the form of consumer items for contact with the human body. The production of TPU moreover usually takes place at very high temperatures of about 200° C., and when these are used repeatedly over a prolonged period during the production process to give the final product they place particular demands inter alia on the plasticizer used. At said temperature, the plasticizer has to avoid decomposition, and it also has to avoid reaction with atmospheric moisture or with other constituents of the TPU, which during the heating procedure usually undergoes a molar-mass reduction that is at least to some extent reversed on cooling. TPU is usually supplied in the form of white or even transparent pallets, and discoloration is therefore also undesirable.

The object of the present invention therefore consisted in developing a plasticized thermoplastic polyurethane, where the plasticizer used is to have good incorporation capability, is not to exude, is not to be lost by evaporation, and at the same time is intended to improve, or at least not adversely affect, the properties of the plastic, examples being processability, heat resistance, transparency, and/or whiteness, and UV resistance. The plasticizer should moreover have low toxicity, so that by way of example it can also be used in foods or materials which come into contact with foods or with human skin.

The object was achieved via a thermoplastic polyurethane comprising at least one plasticizer, where a first plasticizer (i) is based on glycerol, and at least one hydroxy group of the glycerol has been esterified with a monocarboxylic acid (ii) which comprises 1, 2, 3, 4, 5, or 6 carbon atoms, preferably 2, 3, or 4 carbon atoms, and more preferably 2 carbon atoms. The term used for this group of substances hereinafter is glycerol carboxylates. Further preference is given to glycerol tricarboxylates, and the material is particularly preferably glycerol triacetate.

The invention further provides a process for producing thermoplastic polyurethane comprising plasticizer, where at least one plasticizer (i) of the invention is added to the thermoplastic polyurethane during and/or after the production process, and also provides processes for producing products from the polyurethanes of the invention. The invention further provides a product which is based on a polyurethane comprising at least one plasticizer (i), inter alia in mixtures with other plastics. The term thermo-plastic polyurethane is used to mean a thermoplastic polyurethane which comprises only one thermoplastic polyurethane, i.e. one which consists essentially of one isocyanate, polyol, optionally chain extender, and further additives and auxiliaries, but is also used to mean a mixture of various such thermoplastic polyurethanes.

The invention further provides the use, as plasticizer in thermoplastic polyurethanes, of glycerol esterified with at least one aliphatic carboxylic acid.

This invention also provides a process for producing or coating products, where the thermoplastic polyurethanes comprising the at least one plasticizer (i) of the invention are dissolved in a solvent prior to or during the process.

Said plasticizers not only provide excellent mechanical stability of the plastics plasticized by the plasticizer of the invention, but also exhibit little tendency toward exudation, and are moreover not toxic or have only low toxicity in comparison with other plasticizers. They also exhibit high resistance to the temperatures arising during TPU processing, and at the same time the mechanical properties of the TPU are not adversely affected during processing.

The raw materials required for their production can moreover be obtained from renewable resources. Good compatibility with other, polar plasticizers, in particular esters of tricarboxylic acids, provides the possibility of plasticizer combinations aimed at achieving modification of a material or establishing specific properties, e.g. particularly low Shore hardness values.

In preferred embodiments, Shore A hardness to DIN 53505 is above 15 Shore A and at the same time less than 60 Shore A, more preferably less than 50 Shore A, still more preferably less than 40 Shore A, and in particular less than 35 Shore A. Further advantages of the plasticizers of the invention are that they have good miscibility inter alia with polar polyurethanes and it is therefore possible to incorporate markedly higher proportions of the plasticizer, giving lower Shore A hardness values. The advantages mentioned are particularly clearly evidenced in the preferred embodiments.

In one preferred embodiment, at least one further plasticizer is used alongside the plasticizer (i) of the invention, and is preferably an ester of a tricarboxylic acid. Said tricarboxylic acid preferably has an aliphatic structure, where the aliphatic structure has branching and has from 4 to 30 carbon atoms, more preferably from 4 to 20 carbon atoms, particularly preferably from 5 to 10 carbon atoms, and very particularly preferably 6 carbon atoms. The carbon atoms in the branched aliphatic structure here have direct bonding to one another by way of a single or double bond. It is preferable that the aliphatic structure has only single bonds between the carbon atoms.

In an embodiment which is further preferred, the tricarboxylic acid comprises at least one hydroxy group. The at least one hydroxyl group has direct bonding to a carbon atom of the aliphatic structure described above for the tricarboxylic acid in such a way that the at least one hydroxy group, in addition to the three acid groups, has bonding to the aliphatic structure. There is particularly preferably precisely one hydroxy group on the aliphatic structure of the tricarboxylic acid. A particularly preferred tricarboxylic acid is citric acid.

In one preferred embodiment, all three acid groups of the tricarboxylic acid have been esterified with an alcohol. The alcohol can comprise aromatic and/or aliphatic structures. Further preference is given to alcohols which comprise from 1 to 30 carbon atoms, more preferably from 1 to 20 carbon atoms, more preferably from 1 to 10 carbon atoms, more preferably from 1 to 8 carbon atoms, and particularly preferably from 1 to 6 carbon atoms. It is preferable to use alcohols having an aliphatic structure, and it is more preferable that the alcohols have linear aliphatic structures, and it is particularly preferable that the aliphatic structures have no double bonds.

In an embodiment which is further preferred, the alcohols comprise a multiple of 2 carbon atoms, i.e. 2, 4, 6, 8, 10, 12, 14, 16, 18 or 20 carbon atoms. It is further preferable that the alcohols are linear aliphatics.

In one particularly preferred embodiment, the alcohol is ethanol. In the second very particularly preferred embodiment, the alcohol is a butanol. In an alternate embodiment, the alcohol is propanol. It is further preferable that all of the three acid groups of the tricarboxylic acid have been esterified with the same alcohol.

In other preferred embodiments, the at least one hydroxy group of the tricarboxylic acid has additionally been esterified by a carboxylic acid. The carboxylic acid has been selected from aromatic or aliphatic carboxylic acids having from 1 to 40 carbon atoms, more preferably from 1 to 30 carbon atoms, particularly preferably from 2 to 22 carbon atoms, which more preferably have a linear arrangement and, in embodiments to which further preference is given, the number of carbon atoms in these is a multiple of 2. It is very particularly preferable that the hydroxy group has been esterified with an acetic acid.

In other preferred embodiments, the at least one hydroxy group of the tricarboxylic acid has been etherified by the radical $R_{OH}$. The radical $R_{OH}$ comprises from 1 to 40 carbon atoms, more preferably from 1 to 30 carbon atoms, particularly preferably from 2 to 22 carbon atoms, and in particularly preferred embodiments here the number of carbon atoms is a multiple of 2, and said alcohol more preferably has a linear aliphatic structure. In embodiments to which further preference is given, the material is polyethylene glycol or polypropylene glycol. Polyethylene glycol is further preferred.

In the abovementioned embodiments, it is preferable that no further heteroatoms are present in the ester, alongside the oxygen atoms of the three carboxy groups of the tricarboxylic acid and the hydroxy group thereof.

In alternate embodiments, the tricarboxylic acid comprises at least one amine group. In preferred embodiments, a carboxylic acid forms an amide with said amine group. Said carboxylic acid has been selected from aromatic or aliphatic carboxylic acid having from 1 to 40 carbon atoms, more preferably from 1 to 30 carbon atoms, particularly preferably from 1 to 22 carbon atoms, where, in particularly preferred embodiments, the number of carbon atoms in the carboxylic acid is a multiple of 2.

In other preferred embodiments, the at least one amine group of the tricarboxylic acid forms a secondary amine with at least one radical R' or forms a tertiary amine with a second radical R". The radicals R' and R" comprise, independently of one another, from 1 to 40 carbon atoms, more preferably from 1 to 30 carbon atoms, particularly preferably from 2 to 22 carbon atoms, where in particularly preferred embodiments the number of carbon atoms is a multiple of 2. In embodiments to which further preference is given, the radical is a polyethylene glycol or polypropylene glycol, preferably polyethylene glycol.

In one very particularly preferred embodiment, the tricarboxylic ester used as second plasticizer is tributyl 2-acetoxy-1,2,3-tricarboxylate.

The process for esterifying the 3 hydroxy groups of the glycerol with at least one monocarboxylic acid to give a plasticizer of the invention is preferably carried out by using the glycerol as initial charge in a reaction vessel, and reacting a monocarboxylic acid, preferably acetic acid. The mixture is preferably heated, with stirring. The molar amount of the acid groups of the carboxylic acid is preferably no more than equimolar in relation to the alcohol groups of the glycerol during the course of the reaction. The water produced during the reaction is removed continuously by distillation. The amount of alcohol groups remaining can be determined by monitoring the OH number, and the amount of as yet unreacted acid groups can be determined by determining the acid number. The ester-formation reaction can be accelerated via addition of catalysts, e.g. titanium tetrabutoxide.

For use as plasticizer in polyurethanes, it is advantageous that the acid number of the glycerol carboxylate, preferably of the glycerol tricarboxylate, has been minimized, since free acid groups can make a contribution to the degradation of the polyester polyurethanes that may be used, and would thus adversely affect their stability.

In some preferred embodiments, one, two, or three hydroxy groups of the glycerol have been esterified with a monocarboxylic acid, and it is preferable that two or three of the hydroxy groups have been esterified with at least one carboxylic acid, and it is particularly preferable that all three of the hydroxy groups of the glycerol have been esterified with a monocarboxylic acid.

In some preferred embodiments, various monocarboxylic acids are present in the glycerol ester. In other preferred embodiments, the same monocarboxylic acid has been used to esterify the esterified hydroxy groups of the glycerol.

The Hazen number representing the intrinsic color of the plasticizers of the invention is preferably smaller than 100, particularly preferably smaller than 50, in particular smaller than 30. This guarantees that the TPU has little intrinsic color.

The alkali content of the plasticizers (i) is preferably smaller than 40 ppm, particularly preferably smaller than 15 ppm, in particular smaller than 5 ppm.

The water content of the plasticizers of the invention is usually smaller than 0.2% by weight, preferably smaller than 0.05% by weight, particularly preferably smaller than 0.02% by weight. Excessive water content leads to foaming of the products on addition of isocyanate, and to undesired formation of urea, and to impairment of mechanical properties.

The thermoplastics which may be used in conjunction with the plasticizer (i) are preferably acrylonitrile-butadiene-styrene (ABS), polyamides (PA), polylactate (PLA), polymethyl methacrylate (PMMA), polycarbonate (PC), polyethylene terephthalate (PET), polybutylene phthalate (PBT), polyether ketone (PEEK), and polyvinyl chloride (PVC), or thermoplastic polyurethane (TPU); particular preference is given to thermoplastic polyurethane (TPU).

The amount of the plasticizer (i) of the invention comprised within the thermoplastic, preferably the thermoplastic polyurethane, optionally together with the plasticizer which is an ester of a tricarboxylic acid, is from 1 to 80% by weight, preferably from 1 to 70% by weight, particularly preferably from 5 to 50% by weight, in particular from 10 to 40% by weight, based in each case on the total weight of the thermoplastic comprising the plasticizer (i).

The ratio by weight between the amount used of the ester of the tricarboxylic acid and the amount used of the plasticizers of the invention is preferably from 2:1 to 1:10, particularly preferably from 1:1 to 1:5, and very particularly preferably from 1:1.5 to 1:3.

The production of thermoplastic polyurethanes is known. The thermoplastic polyurethanes comprising the plasticizer (i) of the invention can preferably be obtained via reaction of (a) isocyanates with (b) compounds which have a molar mass of from 0.5 kg/mol to 1 kg/mol and which are reactive toward isocyanates, and optionally (c) chain extenders with a molar mass of from 0.05 kg/mol to 0.499 kg/mol, optionally in the presence of (d) catalysts, and/or of (e) conventional auxiliaries. In one preferred embodiment, the plasticizer is metered into at least one of the starting materials during the production of the TPUs, and in another preferred embodiment it is admixed with the previously produced TPU, preferably in an extruder. The thermoplastic polyurethane can be further processed by methods used for thermoplastics, without loss of the action of the plasticizers of the invention.

The components usually used in producing the preferred thermoplastic polyurethane (TPU) will be described by way of example below, these being (a) isocyanate, (b) compounds reactive toward isocyanates, (c) chain extenders, and also optionally (d) catalysts, and/or (e) conventional auxiliaries:

The term structural components is used for the following components, individually or together: (a) isocyanate, (b) compounds reactive toward isocyanates, and (c) chain extenders.

Organic isocyanates (a) which are used are preferably aliphatic, cycloaliphatic, araliphatic, and/or aromatic isocyanates, more preferably tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'-, and 2,2'-diisocyanate, diphenylmethane 2,2'-, 2,4'-, and/or 4,4'-diisocyanate (MDI), 1,5-naphthylene diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate. Particular preference is given to use of 4,4'-MDI.

Compounds (b) which are reactive toward isocyanates and which are used are preferably polyesterols, polyetherols, and/or polycarbonatediols, for which the collective term "polyols" is also usually used. The number-average molar masses of these polyols are from 0.5 kg/mol to 8 kg/mol, preferably from 0.6 kg/mol to 5 kg/mol, in particular from 0.8 kg/mol to 3 kg/mol, and they preferably have an average functionality of from 1.8 to 2.3, preferably from 1.9 to 2.2, in particular 2. The compounds (b) preferably have only primary hydroxy groups.

Chain extenders (c) which may preferably be used are aliphatic, araliphatic, aromatic and/or cycloaliphatic compounds with a molar mass of 0.05 kg/mol to 0.499 kg/mol, preferably bifunctional compounds, for example diamines and/or alkanediols having from 2 to 10 carbon atoms in the alkylene radical, in particular ethanediol, 1,3-propanediol, 1,4-butanediol, 1,6-hexanediol, and/or di-, tri-, tetra-, penta-, hexa-, hepta-, octa-, nona-, and/or decaalkylene glycols having from 2 to 8 carbon atoms, and preferably corresponding oligo- and/or polypropylene glycols. Mixtures of the chain extenders may also be used here. The compounds (c) preferably have only primary hydroxy groups.

In one preferred embodiment, catalysts which in particular accelerate the reaction between the NCO groups of the diisocyanates (a) and the hydroxy groups of the compound (b) reactive toward isocyanates and of the chain extender (c) are tertiary amines, in particular triethylamine, dimethylcyclohexylamine, N-methylmorpholine, N,N'-dimethylpiperazine, 2-(dimethylaminoethoxy)ethanol, diazabicyclo[2.2.2]octane, and the like, and in another preferred embodiment organometallic compounds, such as titanic esters, iron compounds, preferably ferric acetylacetonate, tin compounds, preferably stannous diacetate, stannous dioctoate, stannous dilaurate, or the dialkyltin salts of aliphatic carboxylic acids, e.g. dibutyltin diacetate, dibutyltin dilaurate. The amounts preferably used of the catalysts (d) are from 0.0001 to 0.1 part by weight per 100 parts by weight of the compound (b) reactive with isocyanates. It is preferable to use tin catalysts, in particular stannous dioctoate.

Besides catalysts (d), other materials which may be added to the structural components (a) to (c), alongside the inventive plasticizers (i), are conventional auxiliaries (e). By way of example, mention may be made of surface-active substances, fillers, flame retardants, nucleating agents, antioxidants, lubricants, and mold-release agents, dyes, and pigments, stabilizers e.g. with respect to hydrolysis, light, heat, or discoloration, optionally in addition to the stabilizers of the invention, inorganic and/or organic fillers, reinforcing agents, and plasticizers. Hydrolysis stabilizers used are preferably oligomeric and/or polymeric aliphatic or aromatic carbodiimides. Stabilizers may preferably be added to the inventive TPUs to stabilize them with respect to aging. For the purposes of the present invention, stabilizers are additives which protect a plastic or a plastic mixture from adverse effects of the environment. Examples are primary and secondary antioxidants, hindered amine light stabilizers, UV absorbers, hydrolysis stabilizers, quenchers, and flame retardants. Examples of commercially available stabilizers are given in Plastics Additive Handbook, 5th Edition, H. Zweifel, ed., Hanser Publishers, Munich, 2001 ([1]), pp. 98-136.

More details about the above-mentioned auxiliaries and additives can be found in the technical literature, e.g. in Plastics Additive Handbook, 5th edition, H. Zweifel, ed, Hanser Publishers, Munich, 2001.

The molar ratios of structural components (b) and (c) can be varied relatively widely in order to adjust the hardness of TPUs. Successful molar ratios of component (b) to the entire amount of chain extenders (c) to be used have proven to be from 10:1 to 1:10, in particular from 1:1 to 1:4, where the hardness of the TPUs rises as content of (c) increases. The reaction can take place with usual indices, preferably with an index of from 60 to 130, particularly preferably with an index of from 80 to 110. The index is defined via the ratio of the total number of isocyanate groups used during the reaction in component (a) to the groups reactive toward isocyanates, i.e. the active hydrogen atoms, in components (b) and (c). If the index is 100, there is one active hydrogen atom, i.e. one function reactive toward isocyanates, in structural components (b) and (c) for each isocyanate group in structural component (a). At indices above 100, there are more isocyanate groups than OH groups present.

The TPUs can be produced by the known processes, continuously, for example by reactive extruders, or by the belt process, using the one-shot process or the prepolymer process, or can be produced batchwise by the known prepolymer process.

In these processes components (a), (b) and optionally (c), (d), and/or (e) involved in the reaction can be mixed in succession or simultaneously with one another, whereupon the reaction immediately begins. In the extruder process, structural components (a), and (b), and also optionally (c), (d), and/or (e) are introduced into the extruder individually or in the form of a mixture, and are reacted preferably at temperatures of from 100 to 280° C., more preferably at from 140° C. to 250° C., and the resultant TPU is extruded, cooled and granulated.

In one preferred embodiment, at least the plasticizer (i) for producing the thermoplastic polyurethane, and preferably optionally also at least one second plasticizer, the ester of a tricarboxylic acid, is/are added during and/or after production of the thermoplastic. In the case of TPU production, further preference is given to addition in parallel with the following components used: (a) isocyanate, (b) compounds reactive toward isocyanates, (c) chain extenders, and also optionally (d) catalysts, and/or (e) conventional auxiliaries.

Conventional processes by means of injection molding, extrusion, foaming, and/or compression processes are used for processing of the thermoplastic polyurethanes of the invention comprising at least the plasticizer (i), where these usually take the form of granulated material or powder, to give the desired final products. Preference is given to injection molding, extrusion, spinning processes, and sintering processes, also in the form of "powder-slush" processes, and in another preferred embodiment the product is also foamed. For this, a chemical and/or physical blowing agent, or a gas, is added to the thermoplastic polyurethane. This method produces foamed final products.

The thermoplastic polyurethanes of the invention, comprising at least plasticizer (i), are used for producing final products, in particular moldings, and preferred moldings are rollers, shoe soles, cladding in automobiles, hoses, coatings, cables, profiles, laminates, floors for buildings and transport, plug connectors, cable plugs, folding bellows, drag cables, solar modules, wiper blades, cable sheathing, gaskets, drive belts, nonwoven textiles, damping elements, foils or fibers. Preference is equally given to foams, and particularly preferred foams are saddles or cushions, which in one preferred embodiment are separated from a foam slab, and in another preferred embodiment are foamed in a mold.

In one preferred production process for final products from the thermoplastics of the invention, the method is that the thermoplastic polyurethanes are dissolved in a solvent, prior to or during processing. In another preferred process, products are coated with the thermoplastic polyurethane and to this end the thermoplastic polyurethane of the invention is dissolved beforehand in a solvent.

Preferred solvents for thermoplastic polyurethane are those selected from the group of the ionic liquids, dimethylformamide, methyl ethyl ketone, acetone, tetrahydrofuran, and ethyl acetate, preferably tetrahydrofuran and dimethylformamide.

All of the intermediate products and final products produced with the plasticizer (i) have the advantages described in the introduction.

The invention also comprises all of the combinations listed here comprising embodiments which have not been expressly mentioned but which are directly available to the person skilled in the art via combinations of the embodiments listed.

The invention further provides the mixture of the thermoplastic polyurethanes of the invention with at least one further plastic. It is preferable that thermoplastic polyurethane is used in a mixture with at least one further plastic which is preferably selected from the group of acrylonitrile-butadienestyrene (ABS), polyamides (PA), polylactate (PLA), polymethyl methacrylate (PMMA), polycarbonate (PC), polyethylene terephthalate (PET), polyethylene (PE), polypropylene (PP), polystyrene (PS), polyether ketone (PEEK), and polyvinyl chloride (PVC).

EXAMPLES

The examples below reveal the production, and the properties, of polyurethanes. The materials or mixtures of the invention were produced in a one-shot process in a reactive extruder or on a belt system. The plasticizers can be added either directly in the reaction step, or via use of the plasticizers to swell polyethylene granulated material previously produced. It is preferable to use a heatable mixer for this swelling process, or to achieve it by adding plasticizer during an extrusion step.

Example 1 (comparison)

420 parts of diphenylmethane 4,4'-diisocyanate, 88.8 parts of 1,4-butanediol chain extender, and 700 parts of polytetrahydrofuran with number-average molar mass 1 kg/mol are used in the synthesis of TPU in a reactive extruder, where the zone temperatures of the extruder are from 140° C. to 210° C. 15.3 parts of phenolic antioxidant, and 25 ppm of a 25% strength solution of stannous dioctoate in dioctyl adipate are also added as reaction catalyst. The resultant TPU granulated material is subjected to a forming process by injection molding to give test specimens, and (in accordance with DIN 53504) S2 test specimens punched therefrom are subjected to mechanical tests.

Example 2 (of the invention)

306.2 parts of glycerol tributyrate (corresponding to 20% by weight) are added to the formulation of example 1 during the reaction.

The plasticizer is homogeneously absorbed by the TPU.

Example 3 (comparison)

306.2 parts of diethylhexyl adipate (corresponding to 20% by weight) are added to the formulation of example 1 during the reaction.

The plasticizer is not absorbed by the TPU, and the granulated material is inhomogeneous and greasy.

Example 4 (comparison)

312 parts of diphenylmethane 4,4'-diisocyanate, 82.1 parts of 1,4-butanediol chain extender, and 800 parts of polybutyl adipate with number-average molar mass 2400 g/mol, derived from 1,4-butanediol and adipic acid, are used to synthesise TPU by the manual-casting process. 6.4 parts of a hydrolysis stabilizer (oligomeric carbodiimide derived from TMDXI=tetramethylxylyl diisocyanate), and 50 ppm of a 25% solution of stannous dioctoate, as reaction catalyst, are also added to the mixture. The resultant skin is heat-conditioned for 15 hours at 80° C. in a convection oven, and then comminuted. The resultant TPU granulated material is subjected to forming in an injection molding process to give test specimens, and (in accordance with DIN 53504) SP2 specimens punched therefrom are subjected to mechanical tests.

Example 5 (of the invention)

During the reaction, 300.2 parts of glycerol triacetate (corresponding to 20% by weight) are added to the formulation from example 4.

The TPU homogeneously absorbs the plasticizer.

Example 6 (comparison)

During the reaction, 300.2 parts of diethylhexyl adipate (corresponding to 20% by weight) are added to the formulation from example 4.

The TPU does not absorb the plasticizer completely, and the granulated material is inhomogeneous and greasy.

Example 7 (comparison)

282 parts of 4,4'-MDI, 71.7 parts of 1,4-butanediol chain extender, and 641 parts of a polymerdiol made of adipic acid, 1,2-ethanediol, and 1,4-butanediol, the latter in a ratio of 1:1 by weight, with number-average molar mass 2000 g/mol, are used for TPU synthesis in a reactive extruder, where the extruder zone temperatures are from 140° C. to 210° C. 5 parts of a hydrolysis stabilizer (oligomeric carbodiimide derived from TMDXI=tetramethylxylyl diisocyanate) and 0.5 part of a lubricant (partially saponified montanic ester) are also added during the reaction.

The resultant TPU granulated material is subjected to a forming process by injection molding to give test specimens, and (in accordance with DIN 53504) S2 test specimens punched out therefrom are subjected to mechanical tests.

Example 8 (of the invention)

During the reaction, 20% by weight of glycerol triacetate were added to the formulation of example 7.

The TPU homogeneously absorbs the plasticizer.

Example 9 (comparison)

20% by weight of diethylhexyl adipate are added to the formulation of example 7 during the reaction.

The TPU does not absorb the plasticizer completely, and the granulated material is inhomogeneous and greasy.

Properties of the Resultant Products

The mechanical tests are in accordance with DIN 53505 (Shore), 53504 (tensile strength, tensile strain at break), and DIN 53516 (abrasion).

TABLE 1

| Examples | Shore hardness | Tensile strength/ MPa | Tensile strain at break/% | Abrasion/ $mm^3$ |
|---|---|---|---|---|
| 1 comp. | 87 A | 45 | 610 | 39 |
| 2 | 82 A | 37 | 660 | 53 |
| 3 comp. | ~84 A | n.d. | n.d. | n.d. |
| 4 comp. | 86 A | 49 | 590 | 41 |

TABLE 1-continued

| Examples | Shore hardness | Tensile strength/ MPa | Tensile strain at break/% | Abrasion/ $mm^3$ |
|---|---|---|---|---|
| 5 | 80 A | 39 | 700 | 50 |
| 6 comp. | ~85 A | n.d. | n.d. | n.d. |
| 7 comp. | 86 A | 48 | 620 | 40 |
| 8 | 77 A | 37 | 710 | 57 |
| 9 comp. | ~84 A | n.d. | n.d. | n.d. | n.d. = not determinable, since it was impossible to produce any suitable test specimens It can be seen from the table that the Shore hardness values of thermoplastic polyurethanes with the plasticizers of the invention are markedly below those of the parent materials. The mechanical properties of the resultant products are comparable with those of commercially available TPUs; a point that has to be considered here is that as Shore hardness of the products falls their overall softness and elasticity increases.

Example 10 (comparison)

260 parts of 4,4'-MDI, 32.2 parts of 1,2-ethanediol chain extender, and 1000 parts of a polymerdiol made of adipic acid, 1,2-ethanediol, and 1,4-butanediol, the latter in a ratio of 1:1 by weight, with number-average molar mass 2000 g/mol, and 231.2 parts of tributyl acetylcitrate are used for TPU synthesis in a reactive extruder, where the extruder zone temperatures are from 140° C. to 210° C. 10 parts of a hydrolysis stabilizer (oligomeric carbodiimide derived from TMDXI=tetramethylxylyl diisocyanate), 3.08 parts of a phenolic antioxidant, and 4.62 parts of a lubricant (partially saponified montanic ester) are also added during the reaction. The resultant TPU granulated material is used to produce extrudates, and the properties of these are tested.

Example 11 (of the invention)

The product from example 10 is heated to 85° C. in a heatable mixer (DIOSNA), and 25% by weight of glycerol triacetate are admixed. After a mixing step lasting 90 minutes, the product is cooled to room temperature, with stirring. The resultant granulated TPU material is used to produce extrudates, and the properties of these are tested.

The TPU homogeneously absorbs the plasticizer.

Example 12 (of the invention)

The product from example 10 is heated to 85° C. in a heatable mixer (DIOSNA), and 45% by weight of glycerol triacetate are admixed. After a mixing step lasting 180 minutes, the product is cooled to room temperature, with stirring. The resultant TPU granulated material is used to produce extrudates, and the properties of these are tested.

The TPU homogeneously absorbs the plasticizer.

Example 13 (comparison)

The product from example 10 is heated to 85° C. in a heatable mixer (DIOSNA), and 25% by weight of tributyl acetylcitrate are admixed. After a mixing step lasting 90 minutes, the product is cooled to room temperature, with stirring. The TPU granulated material did not absorb the plasticizer, and it is impossible to produce extrudates.

Very little absorption of the additional plasticizer by the TPU occurs.

Example 14 (comparison)

The product from example 10 is heated to 85° C. in a heatable mixer (DIOSNA), and 25% by weight of diethylhexyl adipate are admixed. After a mixing step lasting 90 minutes, the product is cooled to room temperature, with stirring. The TPU granulated material did not absorb the plasticizer, and it is impossible to produce extrudates.

The TPU does not absorb the plasticizer.

Example 15 (comparison)

The product from example 10 is heated to 85° C. in a heatable mixer (DIOSNA), and 25% by weight of dipropylene glycol dibenzoate are admixed. After a mixing step lasting 90 minutes, the product is cooled to room temperature, with stirring. The TPU granulated material did not absorb the plasticizer, and it is impossible to produce extrudates.

Very little absorption of the plasticizer by the TPU occurs.

Properties of the Products Obtained

The tests were carried out in accordance with DIN 53505 (Shore).

TABLE 2

| Examples | Shore hardness |
| --- | --- |
| 10 comparison | 47 A |
| 11 | 36 A |
| 12 | 29 A |
| 13 comparison | 43 A |
| 14 comparison | n.d. ~45 A |
| 15 comparison | n.d. ~45 A | n.d. = not clearly determinable, since complete absorption of plasticizer did not take place.

It can be seen from the table that the plasticizer of the invention is also effective in thermoplastic polyurethane in the presence of other plasticizer-type compounds. Examples 11 and 12 reveal synergistic action of glycerol triacetate in combination with tributyl acetylcitrate.

The invention claimed is:

1. A plasticizer-containing thermoplastic polyurethane obtained by reacting a mixture comprising thermoplastic polyurethane-forming reactants in the presence of tributyl acetyl citrate as a plasticizer, thereby forming a thermoplastic polyurethane, in which glycerol triacetate as a plasticizer is mixed therewith following formation of the thermoplastic polyurethane, wherein the thermoplastic polyurethane-forming reactants comprise an isocyanate component, a polyol component, an optional bifunctional chain extender component, an optional catalyst component and an optional auxiliary component.

2. The plasticizer-containing thermoplastic polyurethane according to claim 1, wherein the Hazen number representing the intrinsic color of the plasticizers is less than 100.

3. The plasticizer-containing thermoplastic polyurethane according to claim 1, wherein the alkali content of the glycerol triacetate is smaller than 40 ppm.

4. The plasticizer-containing thermoplastic polyurethane according to claim 1, wherein the water content of the glycerol triacetate is smaller than 0.2 % by weight.

5. The plasticizer-containing thermoplastic polyurethane according to claim 1, wherein the total amount of the plasticizers is from 1 to 60 % by weight, based on the total weight of thermoplastic polyurethane comprising said glycerol triacetate.

6. The plasticizer-containing thermoplastic polyurethane according to claim 1, wherein the Shore hardness for the plasticizer-containing thermoplastic polyurethane is more than 15 Shore A and smaller than 60 Shore A.

7. The plasticizer-containing thermoplastic polyurethane according to claim 1, wherein the ratio by weight between tributyl acetyl citrate and glycerol triacetate is from 2:1 to 1:10.

8. A process for producing the plasticizer-containing thermoplastic polyurethane according to claim 1, which comprises adding tributyl acetyl citrate to the thermoplastic polyurethane-forming reactants during production of the thermoplastic polyurethane, and adding glycerol triacetate following formation of the thermoplastic polyurethane.

9. A process for producing a product from the plasticizer-containing thermoplastic polyurethane according to claim 1, which comprises producing said product by injection molding, extrusion, foaming, and/or compression processes.

10. A product comprising the plasticizer-containing thermoplastic polyurethane according to claim 1 in a mixture with another plastic.

11. The product according to claim 10, wherein the at least one other plastic is selected from the group consisting of acrylonitrile-butadiene-styrene, polyamides, polylactate, polymethyl methacrylate, polycarbonate, polyethylene terephthalate, polyethylene, polypropylene, polystyrene, polyether ketone, and polyvinyl chloride.

* * * * *